US012524276B1

(12) United States Patent  
Cisneros et al.

(10) Patent No.: US 12,524,276 B1  
(45) Date of Patent: Jan. 13, 2026

(54) TRACING PROCESSES IN DISTRIBUTED CONTAINER SYSTEMS

(71) Applicant: Amazon Technologies, Inc., Seattle, WA (US)

(72) Inventors: Joel Martin Cisneros, Seattle, WA (US); Md Omar Faroque, Frisco, TX (US); Benjamin Du, Kenmore, WA (US); Jong Hyun Lim, Bellevue, WA (US); Rajalakshmi Ramasubramanian, Bellevue, WA (US); Xin Wang, Redmond, WA (US); Rayhan Hossain, Redmond, WA (US); Md Humayun Arafat, Bellevue, WA (US); Kiran K Meduri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 484 days.

(21) Appl. No.: 17/956,325

(22) Filed: Sep. 29, 2022

(51) Int. Cl.  
*G06F 9/50* (2006.01)  
*G06F 9/455* (2018.01)

(52) U.S. Cl.  
CPC ........ *G06F 9/5055* (2013.01); *G06F 9/45558* (2013.01); *G06F 2009/4557* (2013.01)

(58) Field of Classification Search  
CPC .................................................... G06F 9/5055  
See application file for complete search history.

(56) References Cited

U.S. PATENT DOCUMENTS

2014/0325070 A1* 10/2014 Philip ................. H04L 67/1004  
709/226  
2024/0028357 A1* 1/2024 Lan ....................... G06F 9/5077

OTHER PUBLICATIONS

Caviglione, Luca, et al. "Kernel-level tracing for detecting stegomalware and covert channels in Linux environments." Computer Networks 191 (2021): 108010. (Year: 2021).*  
Anjali, Tyler Caraza-Harter, and Michael M. Swift. "Blending containers and virtual machines: a study of firecracker and gVisor." Proceedings of the 16th Acm SIGPLAN/SIGOPS International Conference on Virtual Execution Environments. 2020. (Year: 2020).*

* cited by examiner

*Primary Examiner* — Charlie Sun  
(74) *Attorney, Agent, or Firm* — Knobbe, Martens, Olson & Bear, LLP

(57) ABSTRACT

Techniques implemented by container services to provide users with utilization metrics indicating which processes running inside containers of distributed container systems are driving computing resource consumption. The container service may deploy agents in VMs alongside the containers that are supporting applications, and the agents may include profilers that inject eBPF programs into the kernels of each VM in which containers are running. The eBPF programs collect stack traces from the kernels that represent which processes were being executed when the stack traces were sampled. The profilers may use the stack traces to determine resource utilization for each process, and group the stack trace results based on the container in which the processes are executing. The utilization metrics may be converted into easily digestible visualizations and provided to a user to determine which processes are driving utilization in the containers, which in turn helps the users improve their application code.

20 Claims, 12 Drawing Sheets

TRACING PROCESSES IN DISTRIBUTED CONTAINER SYSTEMS

BACKGROUND

Service providers offer cloud-based services to fulfill users' computing-service needs without the users having to invest in and maintain computing infrastructure required to implement their applications or services. These service providers maintain networks of managed computing resources and functionality to implement various types of scalable, on-demand services to support applications of the users. The service providers may maintain networks of data centers, which in turn may include a number of interconnected computing devices (or "servers"), that provide computing resources to support applications of the users. As an example, service providers may manage and offer container services to users, which are scalable container management services used to deploy, manage, and scale containers on virtual clusters running on underlying computing resources. Generally, containers are virtualized, isolated packages of software that are each allocated use of an operating system and underlying computing resources of a server to run isolated tasks or processes. These container services allow users to run and scale their applications using the containers (or "containerized applications") running on virtual clusters. An application is supported by running groups of tasks on clusters of containers where each cluster is able to run many simultaneous tasks. Users are able to interact with the container services to define a number of containers they would like to have available to support their applications. As applications continue to see increases in size and usage, the number of containers, and utilization of computing resources allocated to the containers, also continues to increase. However, the increase in usage of applications can result in the containers having to utilize all or most of the underlying computing resources allocated for their use, which can reduce performance of the containers and negatively affect performance of the applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
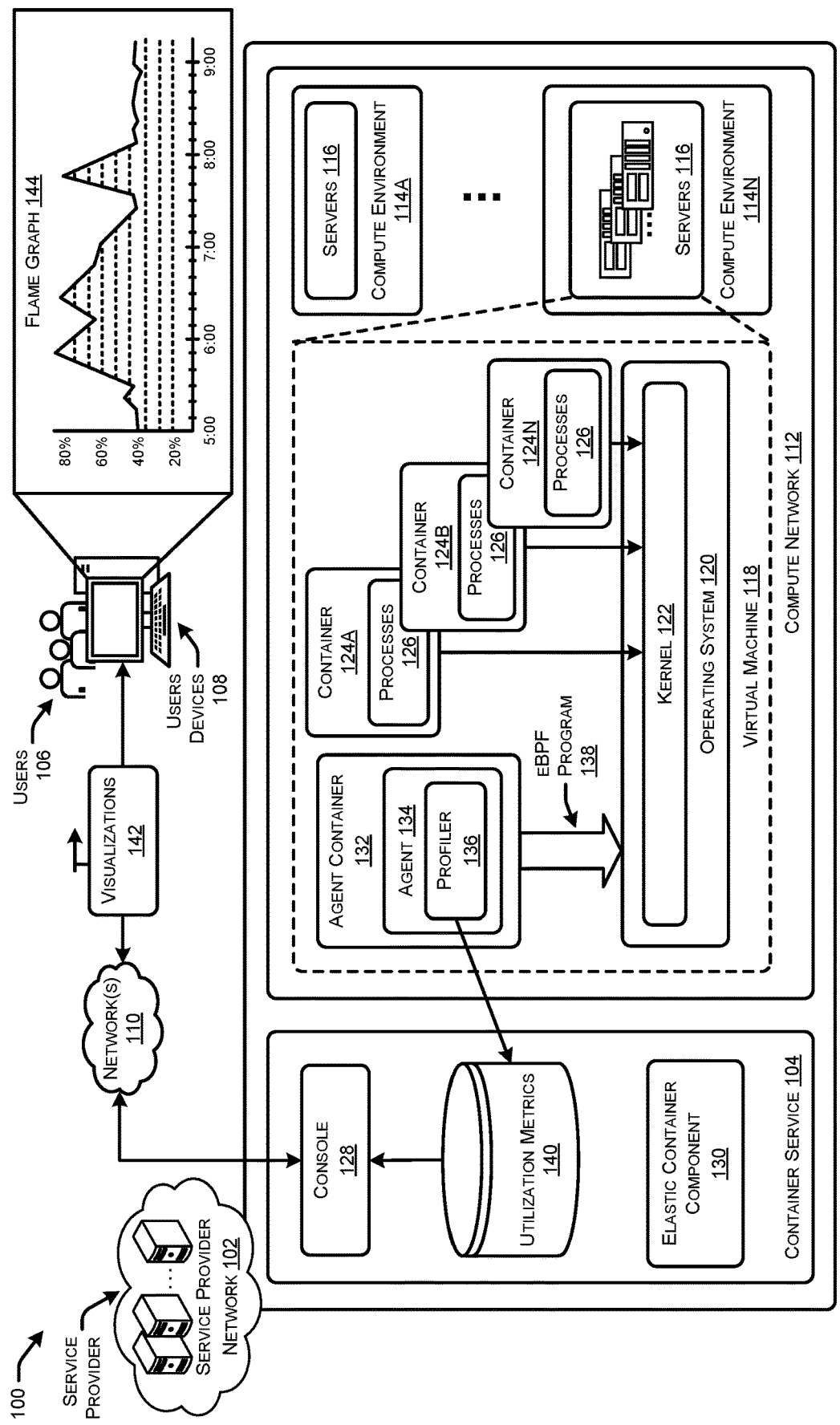
FIG. 1 illustrates a system-architecture diagram of an example environment in which a container service provides users with utilization metrics indicating which processes running inside containers of distributed container systems are driving computing resource consumption.

Understanding which processes running in containers are driving consumption of computing resources, and improving code to reduce unnecessary usage of the computing resources, is a key concern for users of container services. This disclosure describes techniques implemented by container services to provide users with utilization metrics indicating which processes running inside of containers are driving computing resource consumption. Container services allow users to deploy, manage, and scale containers on virtual clusters where each cluster of containers runs a number of tasks simultaneously to support applications of the users. While it is helpful to monitor overall consumption of the computing resources allocated to each container, this information does not provide any visibility into which individual processes running in each container are driving consumption. To generate utilization metrics for containers with process-level granularity, the container service may deploy software agents in agent containers that run in virtual machines (VMs) alongside the containers that are supporting applications. The agents may include profilers that inject extended Berkley Packet Filter (eBPF) programs into the kernel of each VM instance in which containers are running. The eBPF programs collect one or more stack traces from the kernels where each stack trace represents which processes were being executed when the stack trace was sampled. The profilers can use the stack traces to determine or estimate resource consumption (e.g., central processing unit (CPU) consumption, memory consumption, etc.) for each process. Further, the profiler may filter the stack trace results to group processes together based on the container in which the processes are executing. The consumption metrics determined for the processes can be converted from stack trace format into an easily digestible format, such as graphs, charts, or other visualizations (e.g., Flame graph). The visualizations of the consumption metrics for each process in a container can be provided to a user, such as through a console of the container service, and the user can view the visualizations to easily see which processes are driving utilization in the containers supporting their applications, which in turn helps the users improve their application code.

The disclosed container service may manage and scale clusters of containers to run tasks to support applications of users in distributed container systems. For example, the container service may manage clusters of containers running on computing resources of cloud-provider networks and across different locations (e.g., data centers) and/or geographic regions. To manage these types of distributed container systems, the container service may deploy a software agent in an agent container in each VM instance (or on a server itself) in a cluster to perform various operations. For instance, the agents may allow containers to connect to the cluster, and may start, stop, and monitor containers as requested by a user or scheduler.

As noted above, the agents may include a profiler that determines the utilization metrics for individual processes running inside the containers. The profiler may use eBPF programs to collect or generate stack traces from the kernels that are being used by the containers. Generally, eBPF programs are event-driven programs or mechanisms that safely run code in a kernel of an operating system without requiring changes to kernel source code or load kernel modules. In this way, eBPF programs can be "injected," or executed, in the kernel without disrupting the functionality of code of the kernel. Various events may be used to trigger the profiler to execute the eBPF programs to generate and collect the utilization metrics for the processes running in the containers. For instance, the profiler may be configured to execute the eBPF programs according to a predefined schedule, in response to an explicit request from a user, and/or continuously for a defined period of time.

In response to detecting an event, the profiler may execute the eBPF program(s) in the kernel to collect and/or generate stack traces that are usable to determine utilization metrics for the processes running in the containers. In some kernels, such as the Linux R kernel, Application Programming Interfaces (APIs) are built into the kernel and serve as dedicated hooks for collecting stack traces. For kernels without the dedicated hooks, the eBPF programs may be configured to collect stack traces from specific locations in the kernel that are indicated in a map, or a histogram. The eBPF programs may sample stack traces from the kernel locations indicated by the map and store the stack traces in a data structure of the profiler. The eBPF programs may receive identifiers (IDs) for the different containers using each kernel, and filter the stack trace results to group processes together based on the container ID in which the processes are executing.

However, using the profilers to profile stack traces for the kernels can result in thousands of lines of data that can be difficult for a user to comprehend. Accordingly, the profilers may be configured to convert the sampled stack traces into visualizations that allow a user to easily identify which programs in the stack are driving consumption of resources. For instance, a flame graph is a visualization that depicts a stack trace and represents each process that was executed during the sampling period with a timed, horizontal bar. The y-axis shows a stack depth, which is the number of frames or processes running on the stack, and the x-axis of the flame graph may measure the duration of the span of each process in the request. Thus, the longer the span of each horizontal bar, the greater the amount of resources utilized by the process during the sample period. For example, if the flame graph represents CPU utilization, a horizontal bar may represent how many times a process was executing while the eBPF program sampled the kernel. The greater number of times a process was represented during the samples, the more frequently that process was running in the CPU and the greater the number of CPU resources being utilized by the process over time. Thus, the largest horizontal bars, generally at the bottom of the flame graph, represent long-running processes that are consuming the largest amount of computing resources of the kernel.

In some instances, the profiler may generate flame graphs for each container such that a user can easily determine what processes are driving consumption of computing resources. The flame graphs may be used to represent CPU utilization, memory utilization, storage utilization, networking resource utilization, and/or any other type of computing resource utilization. The profilers may output the visualizations to storage locations that are accessible to users, such as via a console of the container service. In some instances, the visualizations may represent averages or other combined representations of computing resources by many containers supporting one or more applications.

According to the techniques described herein, the container service implements these techniques for distributed containerized applications of users. For instance, the container service may cause profilers that are monitoring clusters of containers at different locations (e.g., different regions, different data centers, etc.) to trigger eBPF programs according to a same schedule for particular users, and according to preferences defined by the respective users. In this way, the profilers may provide the users with visualizations representing the utilization metrics of the processes running in the different containers of the users distributed containerized applications at the different locations.

The techniques of this disclosure improve the functioning of container services in various ways. For instance, the techniques provide container services with the ability to provide users with information that was previously unobtainable, and cannot be manually obtained by a user. Further, by generating and outputting the utilization metrics in an easily digestible format, such as a flame graph or other visualization, users can easily see which processes are driving utilization in the containers supporting their applications, which in turn helps the users improve their application code. For instance, the container services may receive updated application code, or modifications to application code, that address or remedy issues that were causing high consumption rates by certain processes. By improving application code, unnecessary waste of computing resources can be reduced, which improves the functioning of container services when hosting distributed applications.

The techniques described herein are with reference to a service provider network, such as a cloud provider network or platform. However, the techniques are equally applicable to any network and in any environment, such as on-premises and/or enterprise networks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a container service 104 provides users with utilization metrics indicating which processes running inside containers of distributed container systems are driving computing resource consumption.

The service provider network 102 may be operated and/or managed by a service provider and may provide various services to users to fulfil their computing resource needs, such as cloud-based computing resources. For instance, users 106 may operate user devices 108 in order to register for use of the computing resources of the service provider network 102.

The service provider network 102 may include a container service 104 that includes components for determining and providing users 106 with utilization metrics indicating resource consumption by processes running inside of containers. Generally, the container service 104 may be, at least partly, a control-plane system that controls operations occurring in the service provider network. The container service 104 may be either centralized or distributed, and be supported by one or more computing devices.

As illustrated, a service provider network 102 may be operated and/or managed by a service provider. The service provider network 102 may provide various services to users to fulfil their computing resource needs, such as cloud-based computing resources. For example, the service provider network 102 may provide cloud-based, scalable, and network accessible compute power services, storage services, database services, and/or other services. Users 106 may utilize user devices 10 to subscribe for use of the computing resources and/or services provided by the service provider network 102.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Users 106 can choose to deploy their virtual computing systems to provide network-based services for their own use and/or for use by their users or client.

The cloud provider network 102 may implement various computing resources or services, which may include a virtual compute service, data processing service(s) (e.g., map reduce, data flow; and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud provider network 102, which may be provisioned in user accounts.

The service provider network 102 may offer many different built-in services to the users 106 to help run their applications and services. For instance, the service provider network 102 may provide users 106 with use of a container service 104. The container service 104 may be used to deploy, manage, and scale containers on virtual clusters running on underlying computing resources. The users 106 can use their user devices 108 to communicate over one or more networks 110 with the container service 104 in order to define or build their applications by providing application code that is to run on clusters of scalable containers 124. The containers are executed on computing resources of a compute network, such as servers located in data centers.

Generally, containers 124 are virtualized, isolated packages of software that are each allocated use of an operating system 120 and kernel 122 and underlying computing resources of a VM 118 (and/or a server) to run isolated tasks or processes 126. The container service 104 allow users 106 to run and scale their applications using the containers 124 (or "containerized applications") running on virtual clusters. An application is supported by running groups of tasks or processes 126 on clusters of containers 124 where each cluster is able to run many simultaneous tasks. Users 106 are able to interact with the container service 104 to define a number of containers 124 they would like to have available to support their applications.

As shown, the compute network 112 may include various compute environments 114, which may be one or more data centers housing servers 116. In some instances, the compute environments may be in different regions of the compute network 112. In some instances, one or more virtual machines 118 may run on the servers 116, and each operating system (OS) 120 may have a kernel 122. The kernel 122 is the core of the operating system 120 that providers basic services for all other parts of the operating system 120. The kernel 122 generally is a main layer between the operating system 120 and underlying hardware of the servers 116, and helps with tasks such as process and memory management, file systems, device control, and networking. As shown, multiple containers 124 may run on a single VM 118 and utilize resources of the same kernel 122 and OS 120. Each container 124 may be part of a cluster and run simultaneous processes 126 that interact with the kernel 122 and OS 120.

Generally, a user 106 may have one or more applications, or instances of applications, running at or in different compute environments 114 and supported by a distributed container system. In this way, users 106 that use the application(s) may access the instances of the applications in different regions or locations.

To manage these types of distributed container systems, the container service 104 may deploy a software agent 134 in an agent container 132 in each VM instance 118 (or on a server 116 itself) in a cluster to perform various operations. For instance, the agents 134 may allow containers 124 to connect to the cluster, and may start, stop, and monitor containers 124 as requested by a user 106 or scheduler.

As noted above, the agents 134 may include a profiler 136 that determines utilization metrics 140 for individual processes 126 running inside the container 124. The profiler 136 may use eBPF programs 138 to collect or generate stack traces from the kernels 122 that are being used by the containers 124. Generally, eBPF programs 138 are event-driven programs or mechanisms that safely run code in a kernel 122 of an operating system without requiring changes to kernel 122 source code or load kernel 122 modules. In this way, eBPF programs 138 can be "injected," or executed, in the kernel 122 without disrupting the functionality of code of the kernel 122. Various events may be used to trigger the profiler 136 to execute the eBPF programs 138 to generate and collect the utilization metrics 140 for the processes running in the containers 124. For instance, the profiler 136 may be configured to execute the eBPF programs 138 according to a predefined schedule, in response to an explicit request from a user 106, and/or continuously for a defined period of time.

In response to detecting an event, the profiler 136 may execute the eBPF program(s) 138 in the kernel 122 to collect and/or generate stack traces that are usable to determine utilization metrics 140 for the processes running in the containers 124. In some kernels 122, such as the Linux kernel 122, APIs are built into the kernel 122 and serve as dedicated hooks for collecting stack traces. For kernels 122 without the dedicated hooks, the eBPF programs 138 may be configured to collect stack traces from specific locations in the kernel 122 that are indicated in a map, or a histogram. The eBPF programs 138 may sample stack traces from the kernel 122 locations indicated by the map and store the stack traces in a data structure of the profiler 136. The eBPF programs 138 may receive identifiers (IDs) for the different containers 124 using each kernel 122, and filter the stack trace results to group processes together based on the container 124 ID in which the processes are executing.

However, using the profilers 136 to profile stack traces for the kernels 122 can result in thousands of lines of data that can be difficult for a user 106 to comprehend. Accordingly, the profilers 136 may be configured to convert the sampled stack traces into visualizations 142 that allow a user to easily identify which programs in the stack are driving consumption of resources. For instance, a flame graph 144 is a visualization 142 that depicts a stack trace and represents each process 126 that executed during the sampling period with a timed, horizontal bar. The y-axis shows a stack depth, which is the number of frames or processes 126 running on the stack, and the x-axis of the flame graph 144 may measure the duration of the span of each process 126 in the request. Thus, the longer the span of each horizontal bar, the greater the amount of resources utilized by the process 126 during the sample period. For example, if the flame graph represents CPU utilization, a horizontal bar may represent how many times a process was executing while the eBPF program 138 sampled the kernel 122. The greater number of times a process 126 was represented during the samples, the more frequently that process was running in the CPU and the greater the number of CPU resources being utilized by the process 126 over time. Thus, the largest horizontal bars, generally at the bottom of the flame graph 144, represent the processes 126 that are consuming the largest amount of computing resources of the kernel 122.

In some instances, the profiler 136 may generate flame graphs 144 for each container 124 such that a user 106 can easily determine what processes 126 are driving consumption of computing resources (e.g., servers 116). The flame graphs 144 may be used to represent CPU utilization, memory utilization, storage utilization, networking resource utilization, and/or any other type of computing resource utilization. The profilers 136 may output the visualizations to storage locations that are accessible to users, such as via a console 128 of the container 124 service.

The users 106 may utilize their devices 108 to communicate over one or more networks 110 (e.g., WANs, PANs, LANs, etc.) with the service provider network 102. The user devices may comprise any type of computing device configured to communicate over network(s) 110, such as mobile phones, tablets, laptop computers, desktop computers, televisions, servers, and/or any other type of computing device. The users 106 (e.g., network administrators, organization employees, etc.) may interact with the service provider network 102, via their user account and/or one or more user portals (e.g., web console, command line interface (CLI), application programming interface (API), etc.).

Generally, the container service 104, and components thereof, may comprise software, firmware, and/or other logic that is supported one computing device, or across more computing devices in the service provider network 102. Additionally, the container service 104 may comprise a system of other devices. The techniques described herein are generally described with respect to a service provider network, such as a cloud provider network or platform. However, the techniques are generally applicable for any network, such as on-premises networks, hybrid networks, and so forth.

Figure 2:
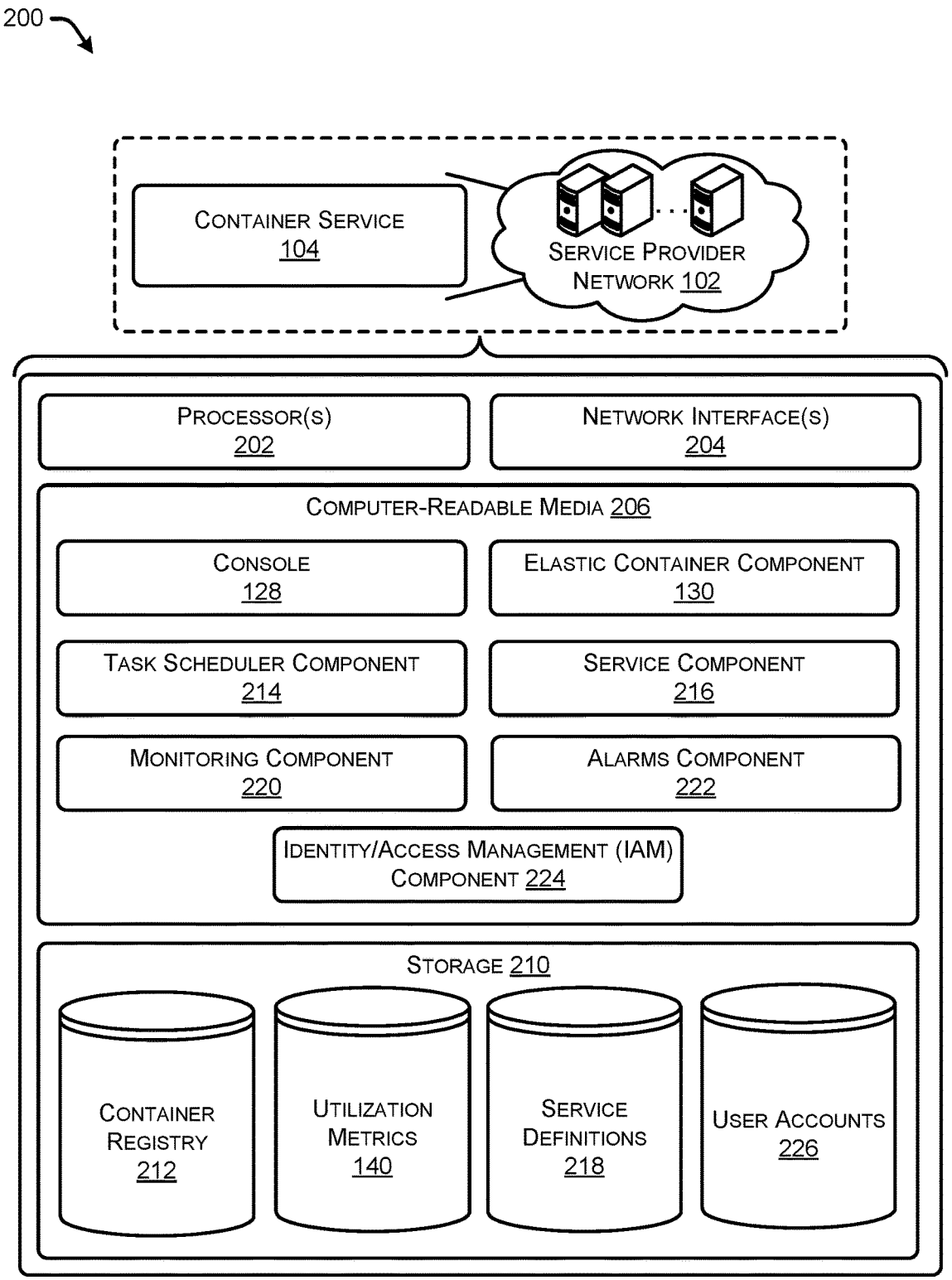
FIG. 2 illustrates a component diagram of example components of a container service that provides users with utilization metrics indicating which processes running inside containers of distributed container systems are driving computing resource consumption.

FIG. 2 illustrates a component diagram of example components 200 of a container service that provides users with utilization metrics indicating which processes running inside containers of distributed container systems are driving computing resource consumption.

As illustrated, the container service 104 may include one or more hardware processors 202 (processors), one or more devices, configured to execute one or more stored instructions. The processor(s) 202 may comprise one or more cores. Further, the container service 104 may include one or more network interfaces 204 configured to provide communications between the service provider network 102 and other devices, such as the user device(s) 108, and/or other systems or devices in the service provider network 102 and/or remote from the container service 104. The network interfaces 204 may include devices configured to couple to personal area networks (PANs), wired and wireless local area networks (LANs), wired and wireless wide area networks (WANs), and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the container service 104 may include a data store, or storage 208, which may comprise one, or multiple, repositories or other storage locations for persistently storing and managing collections of data such as databases, simple files, binary, and/or any other data. The storage 208 may include one or more storage locations that may be managed by one or more database management systems.

The computer-readable media 206 may store portions, or components, of the container service 104 described herein. For instance, the computer-readable media 206 may store and/or execute the console 128 that allows users 106 to interact with the container service 104, such as providing application code, modifying application code, inputting parameters for the containers that support applications of the user 106, receiving parameters for monitoring the resource consumption of the processes 126, etc.

The computer-readable media 206 may store and/or execute an elastic container component 130 that is configured to help start, stop, scale, and otherwise manage containers that are supporting applications of user 106. The computer-readable media 206 may store and/or execute a task scheduler component 214 that is configured to schedule tasks that support or are included in applications of the user 106. The task scheduler component 214 may cause tasks to execute based on application code, requests from users 106, and/or other events.

The computer-readable media 206 may store and/or execute a service component 216 that is configured to enable users 106 to create service definitions 218, or applications, on behalf of users 106. The service component 216 enables users 106 to run and maintain a specified number of instances of a task definition simultaneously in a cluster. If one of the tasks fails or stops, the service component 216 launches another instance of the task definition to replace it. This helps users 106 maintain a desired number of tasks in the service.

The computer-readable media 206 may store and/or execute a monitoring component 220 that monitors utilization metrics 140 of processes 126 running in containers 124 that support applications of users 106. The monitoring component 220 may determine if utilization metrics 140 indicate that a process 126 is consuming more than a threshold or permitted amount of computing resources (e.g., greater than 50% of CPU utilization). The computer-readable media 206 may store and/or execute an alarms component 222 that is configured to generate alarms or otherwise notify users 106 when processes 126 are consuming more than a threshold or permitted amount of computing resources.

To utilize the services provided by the service provider network 102, the users 106 may register for an account 226 with the service provider network 102. For instance, users 106 may utilize a user device to interact with an identity and access management (IAM) component 224 that allows the users 106 to create user accounts 232 with the service provider network 102. Generally, the IAM component 230 may enable the users 106 to manage their network infrastructures remotely, and view analytics provided by the NAA system 104. Generally, the different user accounts 232 can assume different roles, or sets or permissions/credentials, that allow network users 106 to perform different actions, and be restricted from performing some actions.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
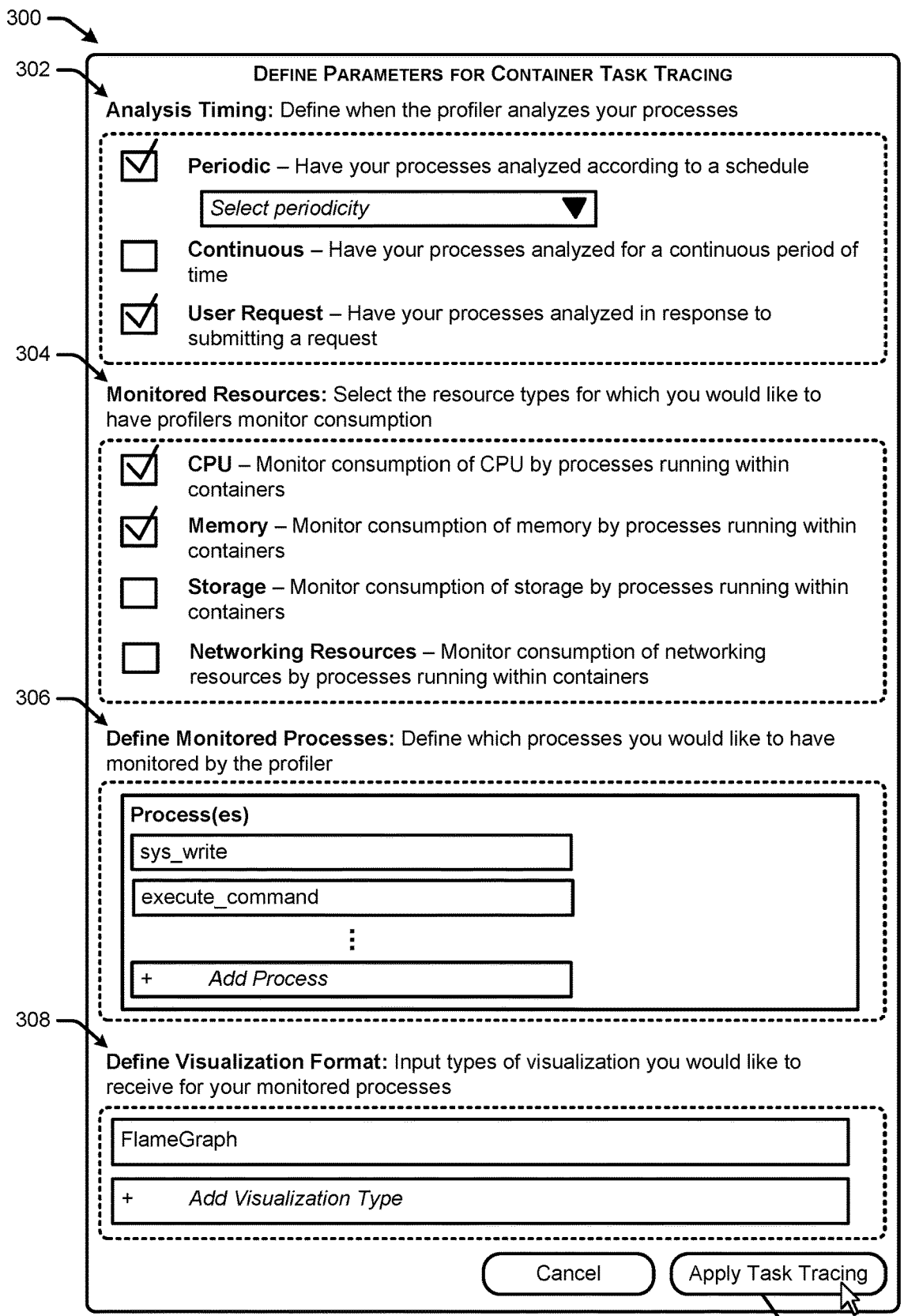
FIG. 3 illustrates a graphical user interface through which a user of a container service can define parameters for the container service to use when generating and providing the user with utilization metrics for processes running in containers.

FIG. 3 illustrates a graphical user interface (GUI) 300 through which a user 106 of a container service 104 can define parameters for the container service 104 to use when generating and providing the user 106 with utilization metrics for processes 126 running in containers 124. It should be understood that the GUI 300 is merely illustrative and any type of user interface, or combination of user interfaces, may be utilized by a user 106 to define parameters for the container service 104.

The GUI 300 includes an analysis timing field 302 through which the user 106 may define when the profiler 136 analyzes containers 124 of the user 106. As shown, the user 106 may select a periodic option where the profiler 136 analyzes the processes 124 according to a schedule. Further, the user 106 may select a continuous option where the processes 126 are analyzed for a continuous period of time. Additionally, the user 106 may indicate they would like to be able to submit a user request that causes the profiler 136 to analyze the processes 126 for resource utilization metrics 140.

The GUI 300 includes a monitored resources field 304 through which the user 106 may define for which resource types the profiler 136 analyzes consumption by the processes 126. The illustrates resource types include CPU, memory, storage, and networking resources (e.g., bandwidth, available ports, etc.). However, additional and/or different resources may be monitored as well (e.g., OS resources, kernel resources, etc.).

The GUI 300 includes a define monitored processes field 306 through which the user 106 may define which processes 126 the user 106 would like to have monitored by the profiler 136. The user 106 may specify which processes 126 are to be monitored, and potentially which processes 126 are not to be monitored, by the profiler 136.

The GUI 300 includes a define visualization format field 308 through which the user 106 may define what type(s) of visualizations 142 they would like to receive to represent the resource consumption of their monitored processes 126. While a flame graph is an example, any other type or visualization may be used (e.g., bar graph, pie graph, etc.).

Once the user 106 has finished inputting their parameters for the container service 104, the user 106 may select the apply task tracing option 310 to cause the container service 104 to implement the parameters and monitor the processes 126.

Figure 4:
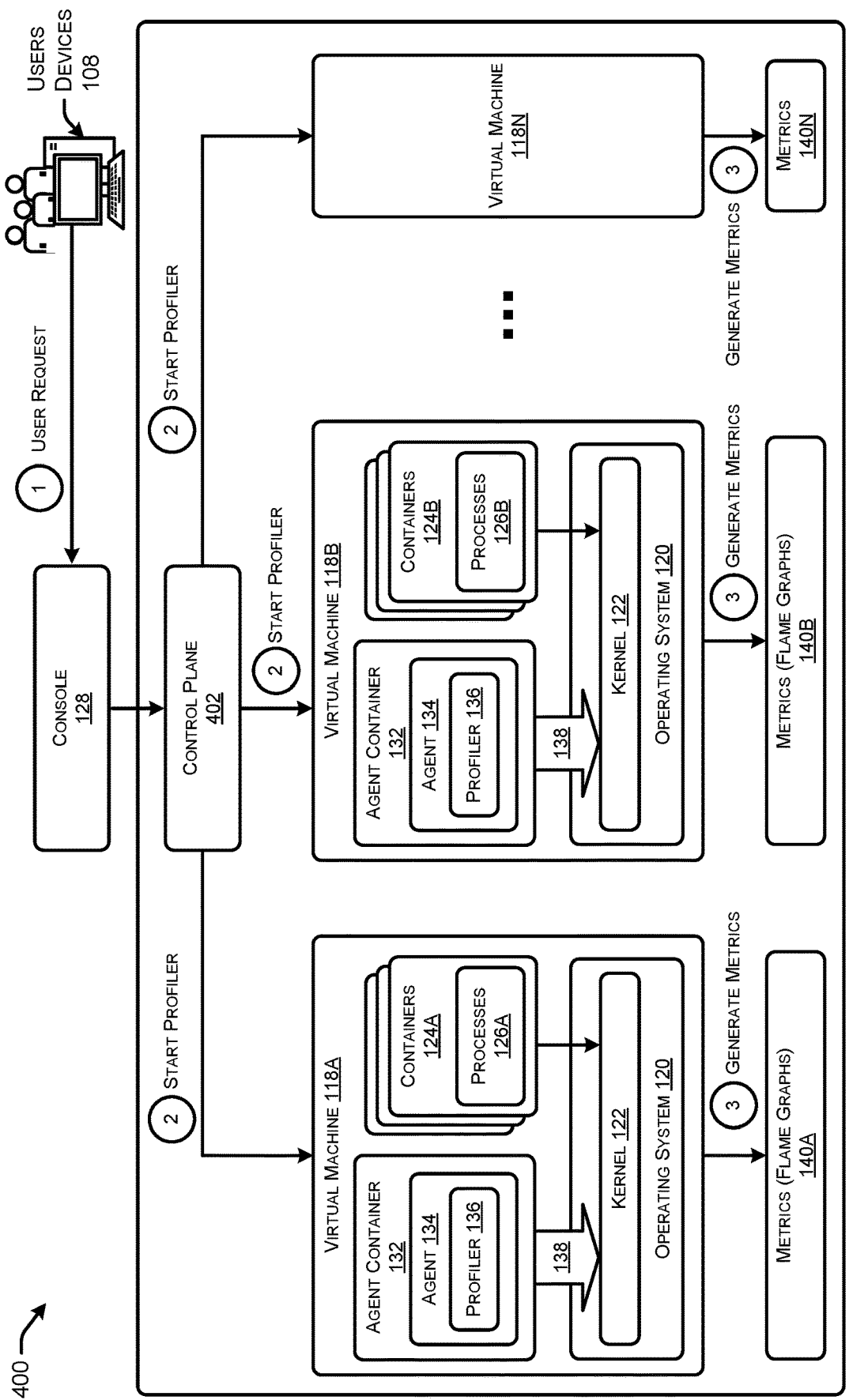
FIG. 4 illustrates an example environment in which a console of a container service receives a user request for utilization metrics, and triggers a control plane operation that causes profilers to generate and provide the utilization metrics for processes running in containers.

FIG. 4 illustrates an example environment in which a console 128 of a container service 104 receives a user request for utilization metrics 140, and triggers a control plane operation 402 that causes profilers 136 to generate and provide the utilization metrics 140 for processes 126 running in containers 124.

At "1," the console 128 receives a user request form a user 106 of a user device 108 instructing the container service 104 to generate utilization metrics 140 indicating utilization of computing resources by processes 126 running in containers 124. While the user request may be an explicit user request sent from a user 106, the user request may be an automated request submitted based on a schedule defined by a user 106.

At "2," the console 128 may trigger a control plane operation 402 to start profilers 136 in the VMs 118 in which the processes 126 are running. The control plane operation 402 may indicate to the profilers 136 which processes 126 to monitor, and an indication of how to sample or otherwise generate the stack traces for the kernels 122.

At "3," the profilers 136 may each generate utilization metrics 140 that represent usage of computing resources by individual processes 126 running in the containers 124. The utilization metrics 140 may simply be raw data (e.g., stack traces), and/or may be converted into visualizations or other formats, such as flame graphs.

Figure 5:
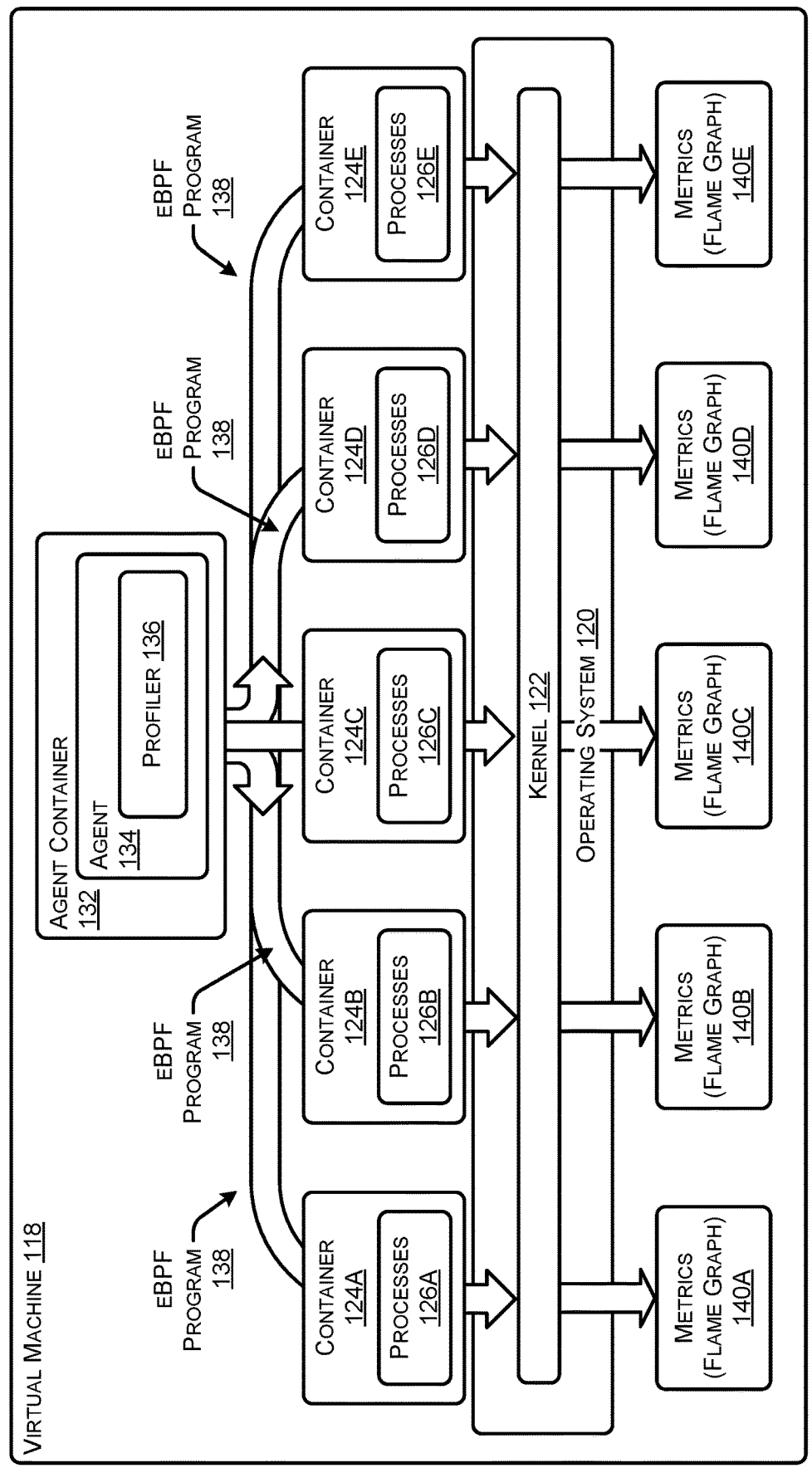
FIG. 5 illustrates an example environment in which a profiler running in a virtual machine uses extended Berkley Packet Filter (eBPF) programs to determine and generate visualizations of utilization metrics for processes running in containers.

FIG. 5 illustrates an example environment 500 in which a profiler 16 running in a virtual machine 118 uses eBPF programs 138 to determine and generate visualizations 142 of utilization metrics 140 for processes 126 running in containers 124.

The example in environment 500 shows a workflow of how a profiler 136 would work within the context of a single VM instance 118, managed by the container service 104, that hosts multiple containers, in this example five containers 124. As shown, the VM instance 118 may receive a request to start the profiler 136 and provide the profiler with 5 specific container IDs to profile. The profiler 136 may then execute the task and simultaneously profiles all containers 124. Once the profiling is done, the profiler 136 outputs flame graphs for each container 124. Once the flame graphs 140 are output, they are aggregated and uploaded to a storage location accessible by user devices 108.

Figure 6:
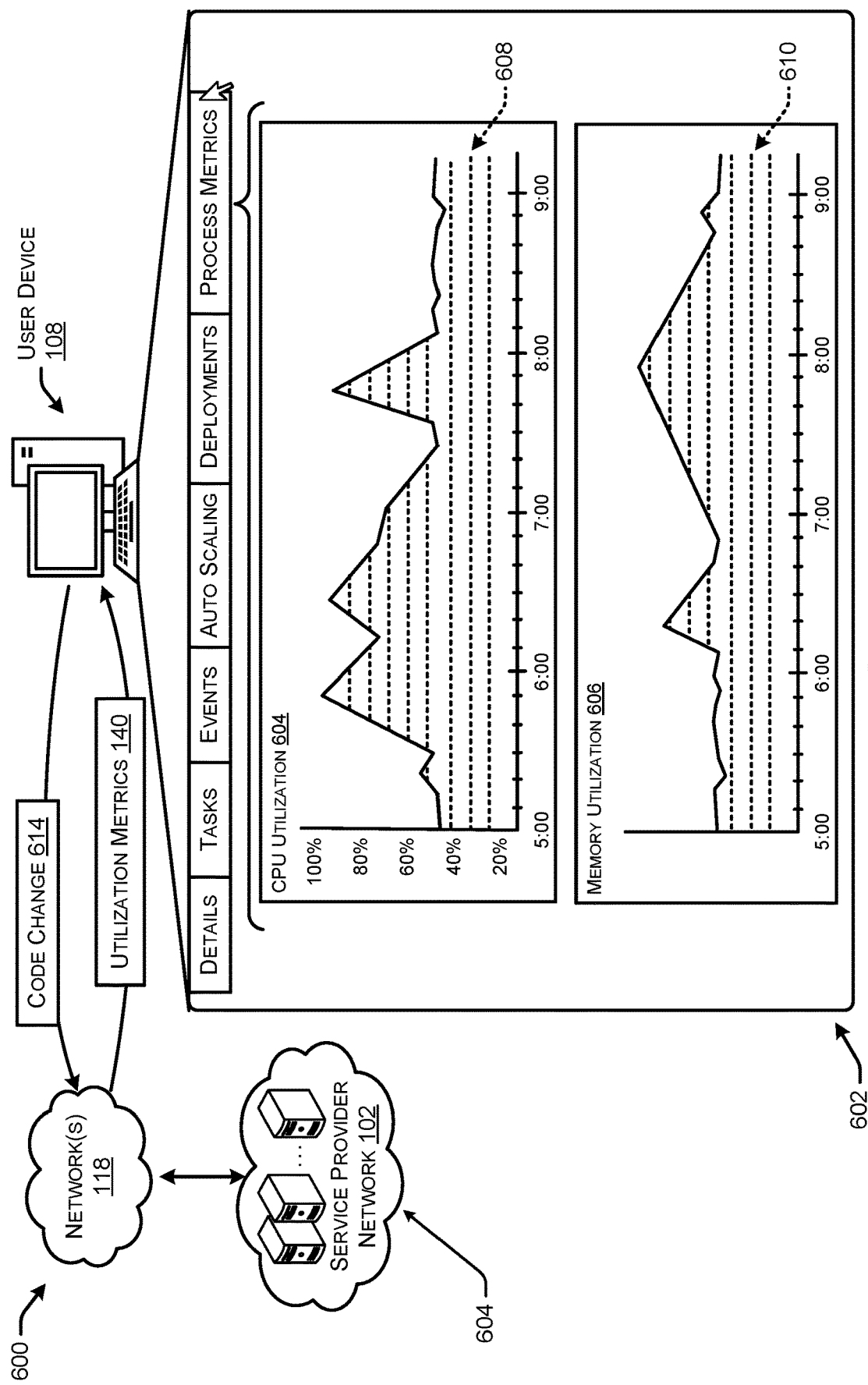
FIG. 6 illustrates a graphical user interface that has flame graphs representing utilization metrics for processes running inside containers of a user.

FIG. 6 illustrates a graphical user interface 602 that has flame graphs representing utilization metrics 140 for processes 126 running inside containers 124 of a user 106.

The GUI 602 has one flame graph that illustrates CPU utilization 604 by processes 126 running in a container 124. The GUI further illustrates a flame graph that depicts memory utilization 604 by processes 126 running in a container 124. The dotted lines 608 and 610 indicate horizontal bars which represent consumption by individual processes 126. Generally, the processes 126 near the bottom of the stack consume greater amounts of resources than the processes 126 at the top of the graphs.

As shown, the flame graphs 604 and 606 are visualizations that depict a stack traces and represent each process that was executed during the sampling period with a timed, horizontal bar. The y-axis shows the processes running in a stack depth, which is the number of frames or processes running on the stack, and the x-axis of the flame graph may measure the duration of the span of each process 126 in the request (e.g., time). Thus, the longer the span of each horizontal bar, the greater the amount of resources utilized by the process 126 during the sample period. For example, if the flame graph represents CPU utilization, a horizontal bar may represent how many times a process 126 was executing while the eBPF program 138 sampled the kernel 122. The greater number of times a process 126 was represented during the samples, the more frequently that process was running in the CPU and the greater the number of CPU resources being utilized by the process 126 over time. Thus, the largest horizontal bars, generally at the bottom of the flame graph, represent long-running processes 126 that are consuming the largest amount of computing resources of the kernel 122.

Figure 7:
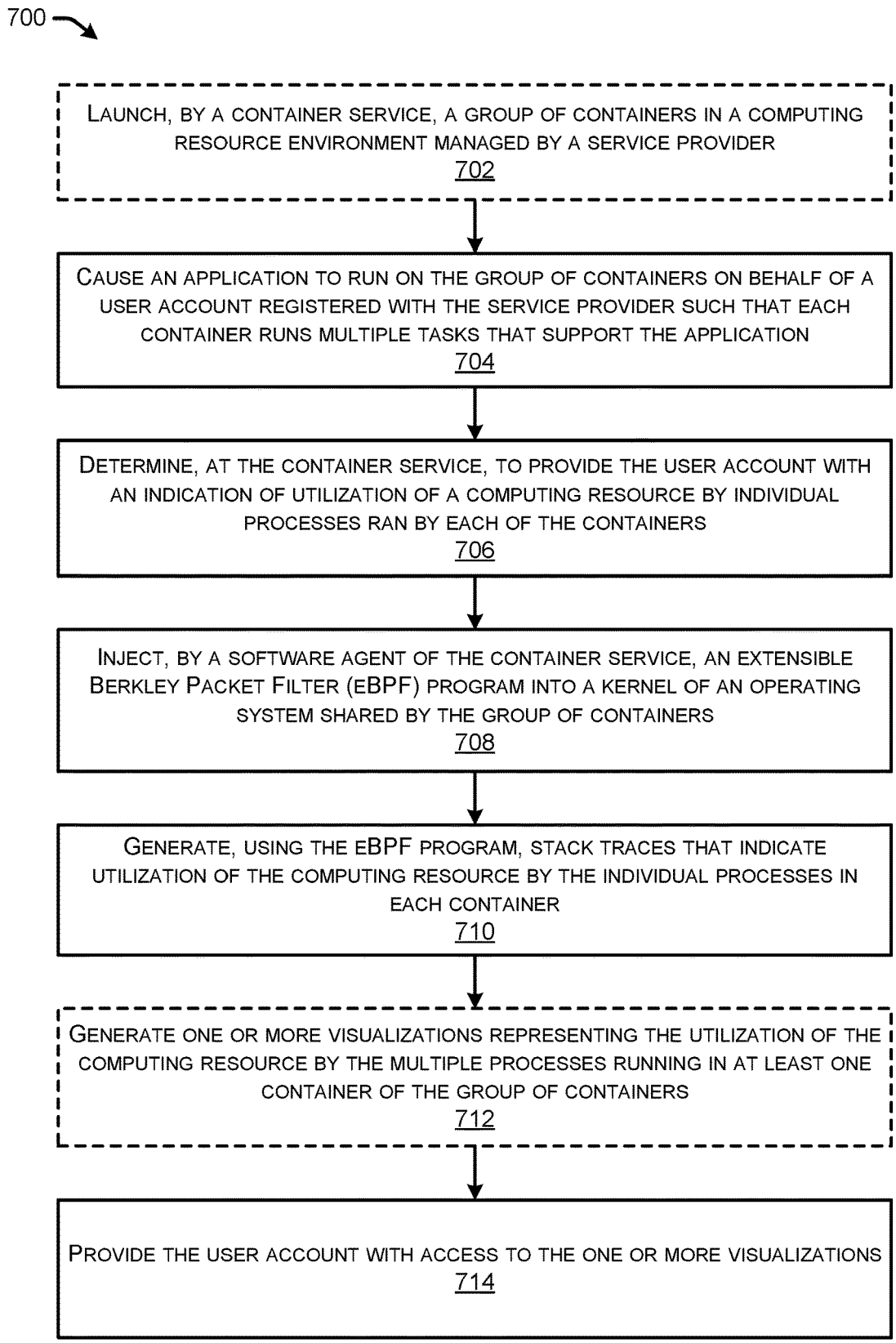
FIG. 7 illustrates a flow diagram of an example method for a container service to determine and provide users with utilization metrics indicating which processes running inside a container are driving computing resource consumption.
Figure 8A:
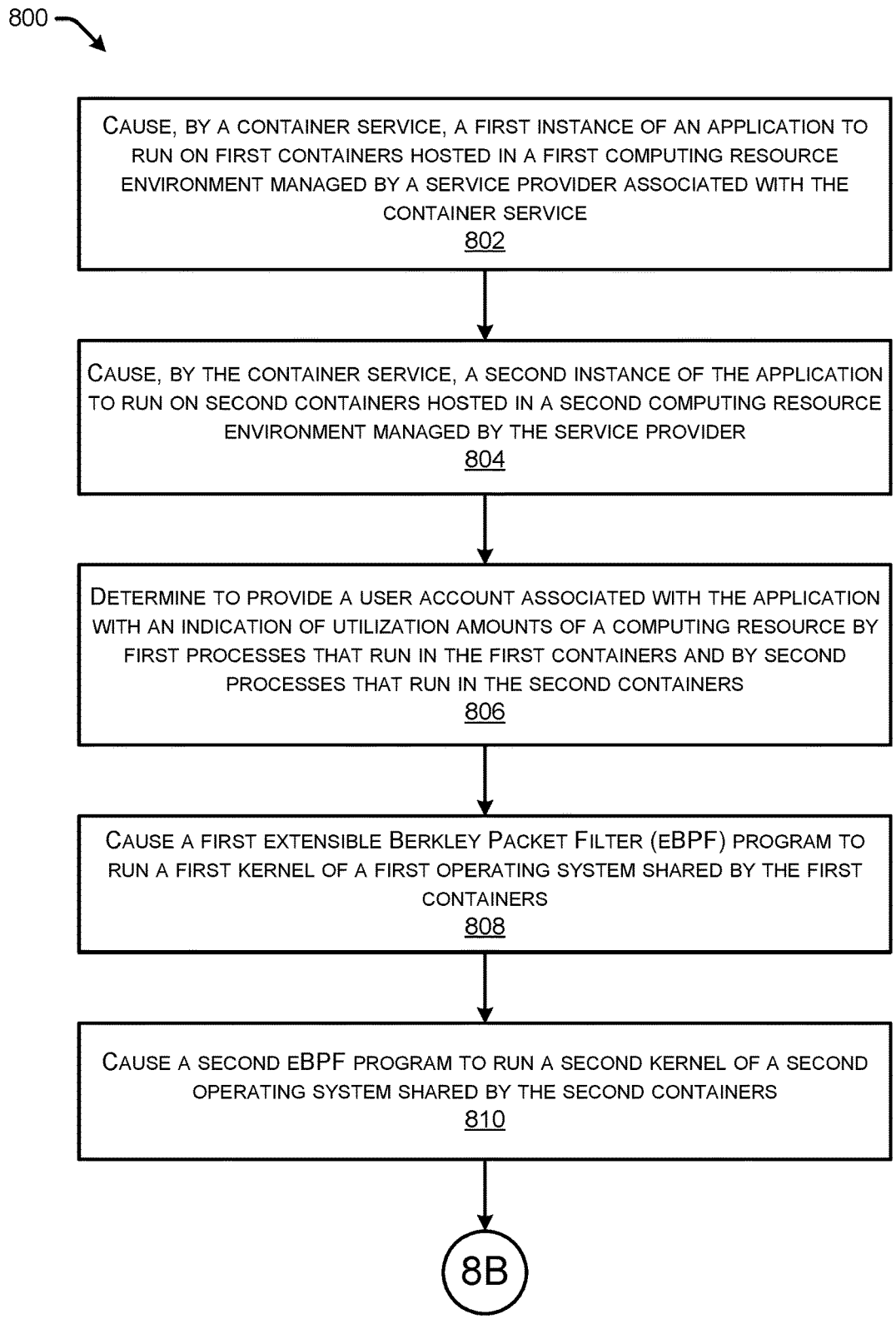
FIGS. 8A and 8B collectively illustrate a flow diagram of an example method for a container service to determine and provide users with utilization metrics indicating which processes running inside multiple containers of distributed container systems are driving computing resource consumption.
Figure 8B:
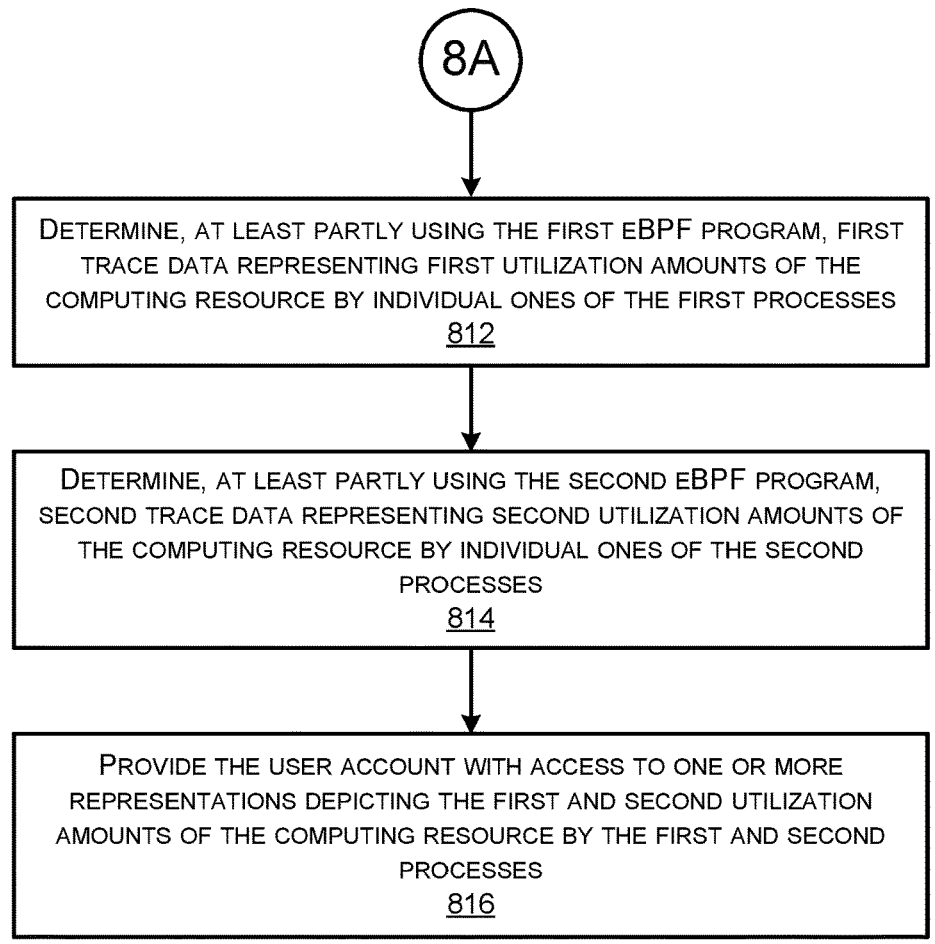

FIGS. 7, 8A, and 8B illustrate flow diagrams of example methods 700 and 800 that illustrate aspects of the functions performed at least partly by the service provider network 102 as described in this disclosure. The logical operations described herein with respect to FIGS. 7, 8A, and 8B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7, 8A, and 8B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for a container service 104 to determine and provide users 106 with utilization metrics 140 indicating which processes 126 running inside a container 124 are driving computing resource consumption.

At 702, a container service may launch a group of containers 124 in a computing resource environment managed by a service provider. For instance, the container service 104 may receive a request from a user 106 to launch containers 124 to in a compute environment 114, such as a data center, that support an application of the user 106.

At 704, a container service 104 may cause an application to run on the group of containers 124 on behalf of a user account 226 registered with the service provider such that each container 124 runs multiple tasks that support the application. For instance, each container 124 may run one or more tasks such that the group of containers 124 collectively perform one or more functions of the application.

At 706, a container service 104 may determine to provide the user account 226 with an indication of utilization of a computing resource by individual processes ran by each of the containers. For instance, the container service 104 may determine to at least one of provide the indication of the utilization on a periodic basis (e.g., schedule), provide the indication of the utilization continuously for a period of time, or provide the indication of the utilization in response to receiving a request from the user account 226.

At 708, a software agent of the container service 104 may inject an extended Berkley Packet Filter (eBPF) program 138 into a kernel 122 of an operating system 120 shared by the group of containers 124. At 710, a software agent of the container service may generate, using the eBPF program, stack traces that indicate utilization of the computing resource by the individual processes in each container. For instance, the eBPF program may collect the stack traces using built-in APIs of the kernel 122, and/or by querying locations in the kernel 122 at which computing resource utilization values by processes 126 may be located.

At 712, a software agent of the container service may generate one or more visualizations representing the utilization of the computing resource by the multiple processes running in at least one container of the group of containers.

As an example, the agent 134 (e.g., profiler 136) may be configured to generate a flame graph 144 that indicates utilization of computing resources by each process 126 in the multiple processes 126 running in one or more containers 124 (e.g., CPU utilization, memory utilization, storage utilization, networking resource utilization, etc.).

At 714, a software agent of the container service may provide the user account with access to the one or more visualizations. For instance, the visualization 142 may be stored in a storage location that is accessible by the user account 226 via a console 128 provided by the container service 104.

FIGS. 8A and 8B collectively illustrate a flow diagram of an example method 800 for a container service 102 to determine and provide users 106 with utilization metrics indicating which processes 126 running inside multiple containers 124 of distributed container systems are driving computing resource consumption.

At 802, a container service may cause, by a container service, a first instance of an application to run on first containers hosted in a first computing resource environment managed by a service provider associated with the container service. In some examples, the first containers 124 may be running in the first computing resource environment that is at least one of on a first server 116, in a first data center, and/or in a first region of a cloud provider network 102.

At 804, a container service may cause, by the container service, a second instance of the application to run on second containers hosted in a second computing resource environment managed by the service provider. In some examples, the second containers 124 may be running in the second computing resource environment that is at least one of on a second server 116, in a second data center, and/or in a second region of a cloud provider network 102. In this way, the first and second instances of the applications may be in a distributed container system.

At 806, a container service may determine to provide a user account associated with the application with an indication of utilization amounts of a computing resource by first processes 126 that run in the first containers 124 and by second processes 126 that run in the second containers 124. For instance, the container service 104 may determine to at least one of provide the indication of the utilization amounts on a periodic basis (e.g., schedule), provide the indication of the utilization amounts continuously for a period of time, or provide the indication of the utilization amounts in response to receiving a request from the user account 226.

At 808, a software agent may cause a first extended Berkley Packet Filter (eBPF) program to run a first kernel of a first operating system shared by the first containers. At 810, a software agent may cause a second eBPF program to run a second kernel of a second operating system shared by the second containers. For instance, agents 134 may be running in respective agent containers 132 and in the first computing resource environment and the second computing resource environment and the container service 104 may coordinate the agents 134 to trigger the eBPF programs 138 for the different processes 126 in the different containers 124.

At 812, a software agent may determine, at least partly using the first eBPF program, first trace data representing first utilization amounts of the computing resource by individual ones of the first processes. At 814, a software agent may determine, at least partly using the second eBPF program, second trace data representing second utilization amounts of the computing resource by individual ones of the second processes. For instance, the eBPF programs 138 may collect the stack traces using built-in APIs of the kernels 122, and/or by querying locations in the kernels 122 at which computing resource utilization values by processes 126 may be located.

At 816, a software agent may provide the user account with access to one or more representations depicting the first and second utilization amounts of the computing resource by the first and second processes. As an example, the agent 134 (e.g., profiler 136) may be configured to generate a flame graph 144 that indicates utilization of computing resources by each process 126 in the multiple processes 126 running in one or more containers 124 (e.g., CPU utilization, memory utilization, storage utilization, networking resource utilization, etc.).

Figure 9:
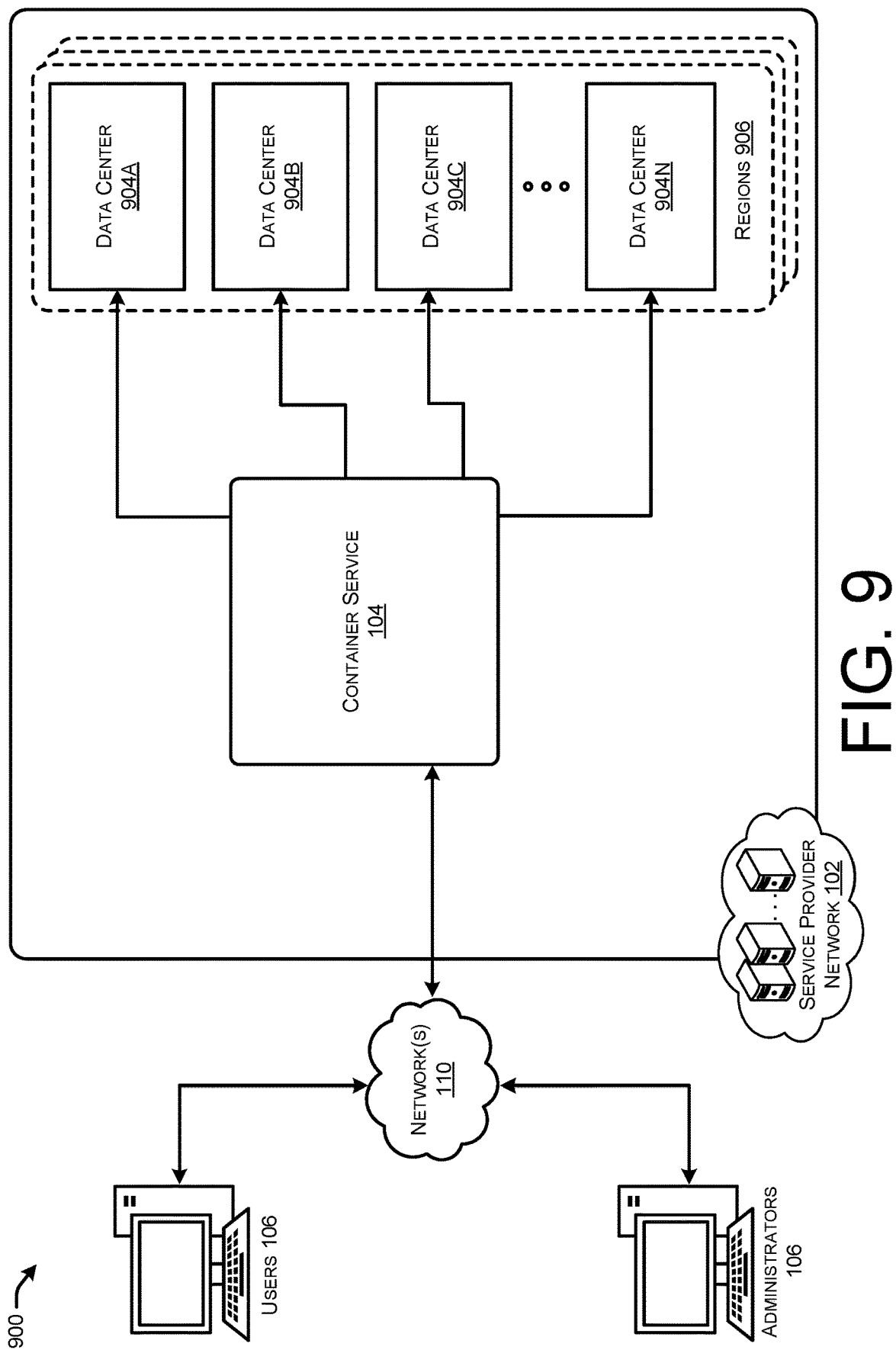
FIG. 9 is a system and network diagram that shows an illustrative operating environment that includes data centers of a service provider network that can be configured to implement aspects of the functionality described herein.

FIG. 9 is a system and network diagram 900 that shows an illustrative operating environment that includes data centers 904 in one or more regions 906 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations, or regions 908. One illustrative embodiment for a data center 904 that can be utilized to implement the technologies disclosed herein will be described below with regard to FIG. 10.

The users 106, such as administrators 106, of the user devices 108 that utilize the service provider network 102 may access the computing resources provided by the service provider network 102 over any wired and/or wireless network(s) 110, which can be a wide area communication network ("WAN"), such as the Internet, an intranet or an Internet service provider ("ISP") network or a combination of such networks. For example, and without limitation, a user device operated by a user 106 of the service provider network 102 may be utilized to access the service provider network 102 by way of the network(s) 110. It should be appreciated that a local-area network ("LAN"), the Internet, or any other networking topology known in the art that connects the data centers 904 to remote clients and other users can be utilized. It should also be appreciated that combinations of such networks can also be utilized.

Figure 10:
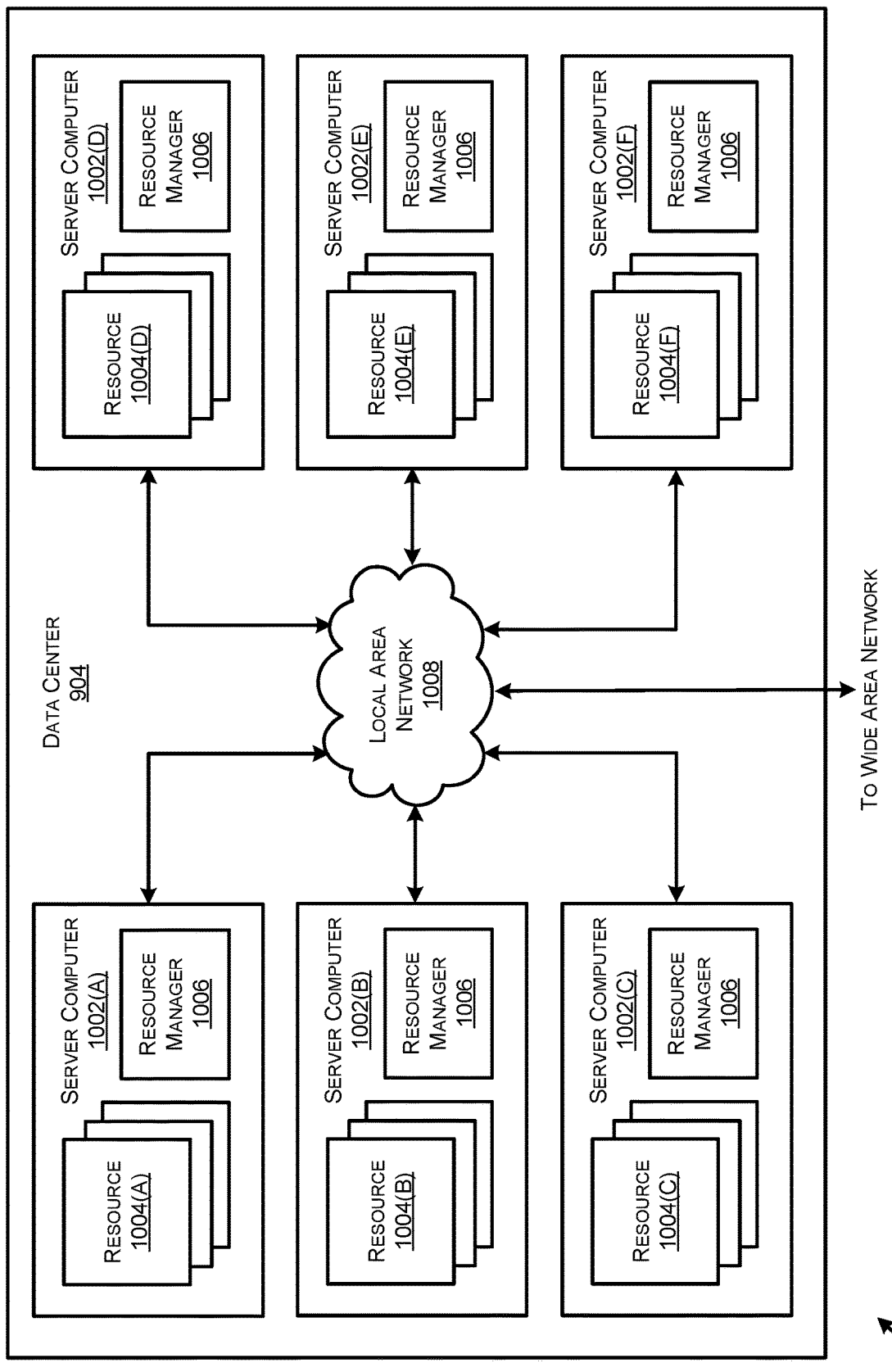
FIG. 10 is a computing system diagram illustrating a configuration for a data center that can be utilized to implement aspects of the technologies disclosed herein.

FIG. 10 is a computing system diagram 1000 that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the computing devices described herein.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 904 can also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations can be utilized.

Figure 11:
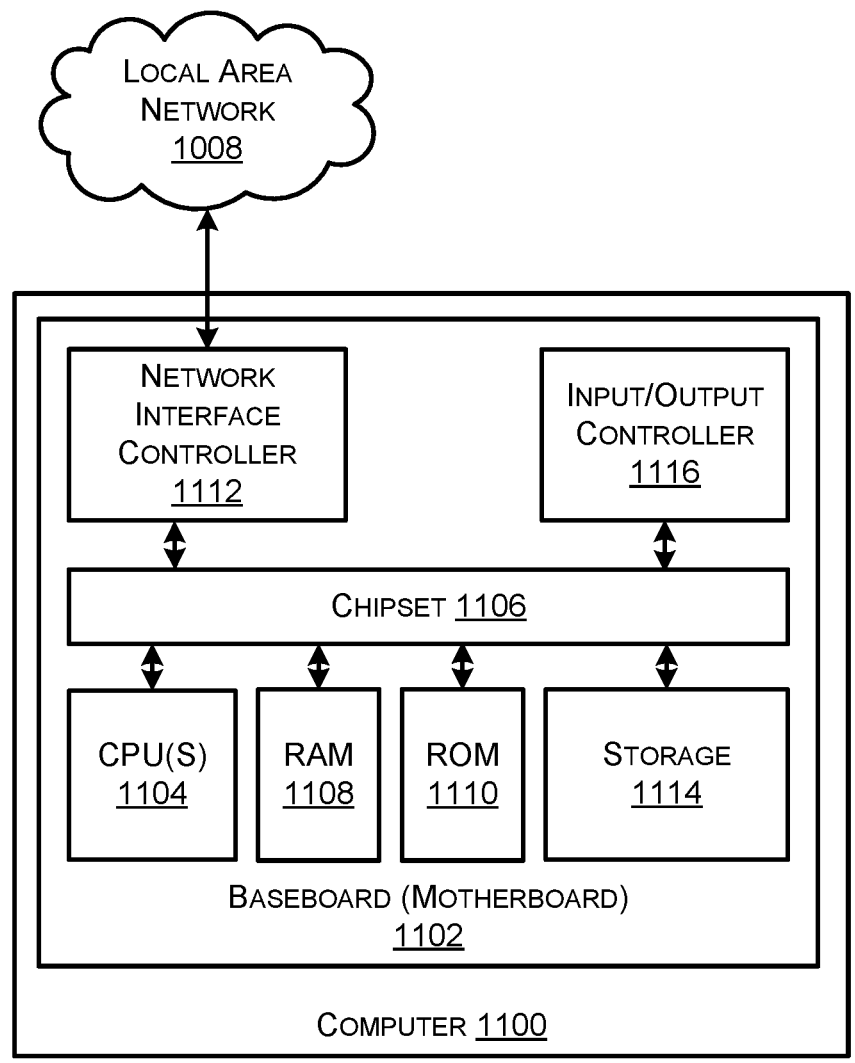
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1108. The chipset 1106 can include functionality for providing network connectivity through a network interface controller (NIC) 1112, such as a gigabit Ethernet adapter. The NIC 1112 is capable of connecting the computer 1100 to other computing devices over the network 1108 (or 104). It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least partly by a container service to determine computing-resource utilization by processes running in containers, the method comprising:

launching, by the container service, a group of containers in a computing resource environment managed by a service provider;

causing an application to run on the group of containers on behalf of a user account registered with the service provider such that each container runs multiple tasks that support the application;

determining, at the container service, to provide the user account with an indication of utilization of a computing resource by individual processes ran by each of the containers;

injecting, by a software agent of the container service, an extended Berkeley Packet Filter (eBPF) program into a kernel of an operating system shared by the group of containers;

monitoring, using the eBPF program injected into the kernel of the operating system, individual processes executing on the operating system to generate stack traces that represent the individual processes in one or more containers and corresponding utilization of the computing resource by each individual process;

generating, based on the generated stack traces, one or more visualizations representing the utilization of the computing resource by the multiple processes running in at least one container of the group of containers; and providing the user account with access to the one or more visualizations.

2. The method of claim 1, wherein:

at least one of the stack traces represents:
  a first amount of a central processing unit (CPU) resource used by a first process of the multiple processes running in the at least one container; and
  a second amount of the CPU resource used by a second process of the multiple processes running in the at least one container; and the one or more visualizations represent at least the first amount of the CPU resource used by the first process and the second amount of the CPU resource used by the second process.

3. The method of claim 1, wherein:

the group of containers run in a virtual machine (VM) that is hosted in the computing resource environment;

the kernel of the operating system belongs to the VM; and the software agent is running in an agent container on the VM.

4. The method of claim 1, wherein the computing resource comprises at least one of:

a central processing unit (CPU) resource; a memory resource;

a storage resource; or a network availability resource.

5. A system for implementing a container service, comprising:

one or more processors; and one or more computer-readable media storing computer-executable instructions that, when executed by the one or more processors, cause the container service to perform operations comprising:

causing an application to run on containers hosted in a computing resource environment managed by a service provider associated with the container service;

determining to provide a user account associated with the application with an indication of utilization amounts of a computing resource by processes that run in the containers to support the application;

injecting an extended Berkeley Packet Filter (eBPF) program into a kernel of an operating system shared by the containers;

monitoring, using the eBPF program injected into the kernel of the operating system, individual processes executing on the operating system to generate trace data representing individual processes running in at least one of the containers and corresponding utilization amounts of the computing resource by individual processes; and providing the user account with access to a representation of the utilization amounts of the computing resources by the individual processes.

6. The system of claim 5, wherein the containers run in a virtual machine (VM) that is hosted in the computing resource environment, the operations further comprising:

providing the eBPF program with identifiers (IDs) for the containers that are usable by the eBPF program to distinguish the containers from each other; and generating the one or more representations such that the utilization amounts are depicted for the processes according to groups based at least in part the IDs of the containers in which the respective processes are running.

7. The system of claim 5, the operations further comprising:

receiving, from the user account, a preference according to which the container service is to provide representations of utilization amounts for the processes running in the containers, the preference indicating that the container service is to at least one of:
  provide the representations of the utilization amounts collected on a periodic basis;
  provide the representations of the utilization amounts collected continuously for a period of time; or
  provide the representations of the utilization amounts in response to receiving a request from the user account.

8. The system of claim 5, the operations further comprising:

generating, using the trace data, a first flame graph representing first utilization amounts by first processes running in a first container; and generating, using the trace data, a second flame graph representing second utilization amounts by second processes running in a second container, wherein the representation provided to the user account includes the first and second flame graphs.

9. The system of claim 5, wherein the trace data represents:

a first amount of a central processing unit (CPU) resource used by a first process running in a particular container;

a second amount of the CPU resource used by a second process running in the particular container; and the representation depicts at least the first amount of the CPU resource used by the first process and the second amount of the CPU resource used by the second process.

10. The system of claim 5, wherein:
the containers run in a virtual machine (VM) that is hosted in the computing resource environment;
the kernel of the operating system belongs to the VM; and
a software agent injects the eBPF program into the kernel and the software agent is running in an agent container on the VM.

11. The system of claim 5, wherein the computing resource comprises at least one of: a central processing unit (CPU) resource;
a memory resource;
a storage resource; or
a network availability resource.

12. The system of claim 5, wherein the containers are first containers hosted in a first data center of the computing resource environment, the operations further comprising:
injecting a second extended eBPF program into a second kernel of a second operating system shared by second containers, the second containers being hosted in a second data center of the computing resource environment;
determining second trace data representing second utilization amounts by individual ones of second processes running in at least one of the second containers; and
providing the user account with access to a second representation of the second utilization amounts of second computing resources by the individual ones of the second processes.

13. A method comprising:
causing, by a container service, a first instance of an application to run on first containers hosted in a first computing resource environment managed by a service provider associated with the container service;
causing, by the container service, a second instance of the application to run on second containers hosted in a second computing resource environment managed by the service provider;
determining to provide a user account associated with the application with an indication of utilization amounts of a computing resource by first processes that run in the first containers and by second processes that run in the second containers;
injecting a first extended Berkeley Packet Filter (eBPF) program into to run a first kernel of a first operating system shared by the first containers;
causing a second eBPF program to run a second kernel of a second operating system shared by the second containers;
monitoring, using the first eBPF program injected into the first kernel of the first operating system, individual processes executing on the first operating system to generate, first trace data representing the first processes and corresponding first utilization amounts of the computing resource;
monitoring, using the second eBPF program injected into the second kernel of the second operating system, individual processes executing on the second operating system to generate, second trace data representing the second processes and corresponding second utilization amounts of the computing resource; and
providing the user account with access to one or more representations depicting the first and second utilization amounts of the computing resource by the first and second processes.

14. The method of claim 13, wherein:
the first containers are in a first cluster running in a first data center located in a first geographic region managed by the service provider; and
the second containers are in a second cluster running in a second data center located in a second geographic region managed by the service provider.

15. The method of claim 13, further comprising:
receiving, from the user account, a preference according to which the container service is to provide the one or more representations of the first and second utilization amounts for the first processes and the second processes, the preference indicating that the container service is to at least one of:
provide the one or more representations of the first and second utilization amounts collected on a periodic basis;
provide the one or more representations of the first and second utilization amounts collected continuously for a period of time; or
provide the one or more representations of the first and second utilization amounts in response to receiving a request from the user account.

16. The method of claim 13, further comprising:
generating, using the first trace data, a first flame graph representing first utilization amounts by the first processes running in at least one of the first containers; and
generating, using the second trace data, a second flame graph representing second utilization amounts by the second processes running in at least one of the second containers, wherein the one or more representations provided to the user account include at least the first and second flame graphs.

17. The method of claim 13, wherein the first trace data represents:
a first amount of a central processing unit (CPU) resource used by one of the first processes running in a particular container of the first containers; and
a second amount of the CPU resource used by another one of the first processes running in the one of the particular container; and
the one or more representations depict at least the first amount of the CPU resource used by the one of the first processes and the second amount of the CPU resource used by the other one of the first processes.

18. The method of claim 13, wherein:
the first containers run in a virtual machine (VM) that is hosted in the first computing resource environment;
the first kernel of the first operating system belongs to the VM; and
a software agent injects the first eBPF program into the first kernel and the software agent is running in an agent container on the VM.

19. The method of claim 13, wherein the computing resource comprises at least one of:
a central processing unit (CPU) resource;
a memory resource;
a storage resource; or
a network availability resource.

20. The method of claim 13, further comprising:
providing the first eBPF program with identifiers (IDs) for the first containers that are usable by the first eBPF program to distinguish the first containers from each other; and
generating the one or more representations such that the first utilization amounts are depicted for the first processes in groups based at least in part the first containers in which the first processes are running.

\* \* \* \* \*